United States Patent [19]

Yashiro

[11] 4,225,939

[45] Sep. 30, 1980

[54] BIDIRECTIONAL DATA COMMUNICATION SYSTEM

[75] Inventor: Kenji Yashiro, Tokyo, Japan

[73] Assignee: Pioneer Electronic Corporation, Tokyo, Japan

[21] Appl. No.: 787,591

[22] Filed: Apr. 14, 1977

[30] Foreign Application Priority Data

Apr. 16, 1976 [JP] Japan .................................. 51/43953

[51] Int. Cl.$^2$ .............................................. H04L 7/04
[52] U.S. Cl. .................................................. 364/900
[58] Field of Search ... 364/200 MS File, 900 MS File; 307/219; 340/147.54, 146.1 D; 179/15 BS

[56] References Cited

U.S. PATENT DOCUMENTS

| | | | |
|---|---|---|---|
| 3,465,301 | 9/1969 | Osborn | 340/172.5 |
| 3,531,777 | 9/1970 | West | 340/172.5 |
| 3,593,301 | 7/1971 | Newcomb | 340/172.5 |
| 3,643,220 | 2/1972 | Vatagi | 340/172.5 |
| 3,676,858 | 7/1972 | Finch et al. | 340/172.5 |
| 3,778,549 | 12/1973 | Schroder et al. | 364/200 |
| 3,781,818 | 12/1973 | Pardoe et al. | 340/172.5 |
| 3,898,373 | 8/1975 | Walsh | 364/200 |
| 3,970,997 | 7/1976 | Daly et al. | 364/200 |

*Primary Examiner*—Gareth D. Shaw
*Assistant Examiner*—C. T. Bartz
*Attorney, Agent, or Firm*—Fraser and Bogucki

[57] ABSTRACT

A bidirectional data communications system having many remote terminals operating with a central unit includes means at each terminal for reproducing a clock from the incoming data. Upstream data from the terminals to the central unit is transmitted at the same frequency as the incoming data using the reproduced clock from the downstream transmission. At the central unit, the incoming data from each terminal is of arbitrary phase, but must be extracted without delay from the upstream transmission for data processing purposes. A clock signal substantially resynchronized with the data stream is provided by detecting the initial presence of data, and timing the frequency division of a higher frequency original clock so that the phase and frequency of the data match the clock requirements at the central unit.

8 Claims, 6 Drawing Figures

BIDIRECTIONAL DATA COMMUNICATION SYSTEM

BACKGROUND OF THE INVENTION

This invention relates to a bidirectional data communication system which transmits and receives data bidirectionally between a central unit and a number of terminal units.

In the past, bidirectional data communications systems having many terminals communicating with a head-end have employed data buffers at each location and have usually separately generated clock frequencies for each direction of transmission. The buffers and clocks are needed to compensate for differences in data rates that may be used in the data processing circuits, and to compensate for arbitrary phase delays that may occur in transmission. In CATV systems, for example, the transmission lines and switching systems between the head-end and individual terminals tend to introduce wide variations in the phase of signals from different points in the system. Thus various compensating techniques have been proposed, including upstream transmissions using a central clock. Such systems however require extensive circuitry, as do systems employing individual clocks or buffers. Furthermore, when a great many subscriber terminals are coupled into the system, there should not be substantial delays in the interrogation sequence, as this would limit the number of subscribers that can be coupled into given head end.

In view of such disadvantages of the conventional data communication system, one object of the present invention is to provide a bidirectional data communication system which does not need clock signal generating circuits and buffer circuits in the respective terminal units and also which is less expensive in practical use as an entire system.

Another object of the present invention is to provide a bidirectional data communication system which can accurately read data transmitted with substantial phase variations to a head end unit from respective terminal units.

SUMMARY OF THE INVENTION

A system in accordance with the invention comprises a bidirectional data transmission system having an original clock source only at the head end that communicates with a substantial number of individual terminals. At the terminals, clocking of upstream transmissions is based upon the generation of a signal synchronous with the downstream data, which is then frequency divided and used in the retransmission of data. At the head end, a higher frequency original clock is frequency divided to the same data rate as is used in transmission. The phase of the frequency divided signal is quickly adjusted to correspond to the incoming data by detecting the initial transitions in the incoming data and resetting the clock so that the circuit quickly recommences operation in the desired phase relationship. Thus as each data message is returned to the head end, phase differences present no problem because the adjusted clock enables extraction of the data content.

BRIEF DESCRIPTION OF THE DRAWINGS

A better understanding of the invention may be had by reference to the following description, taken in conjunction with the accompanying drawings, in which.

DETAILED DESCRIPTION OF THE INVENTION

Figure 1:
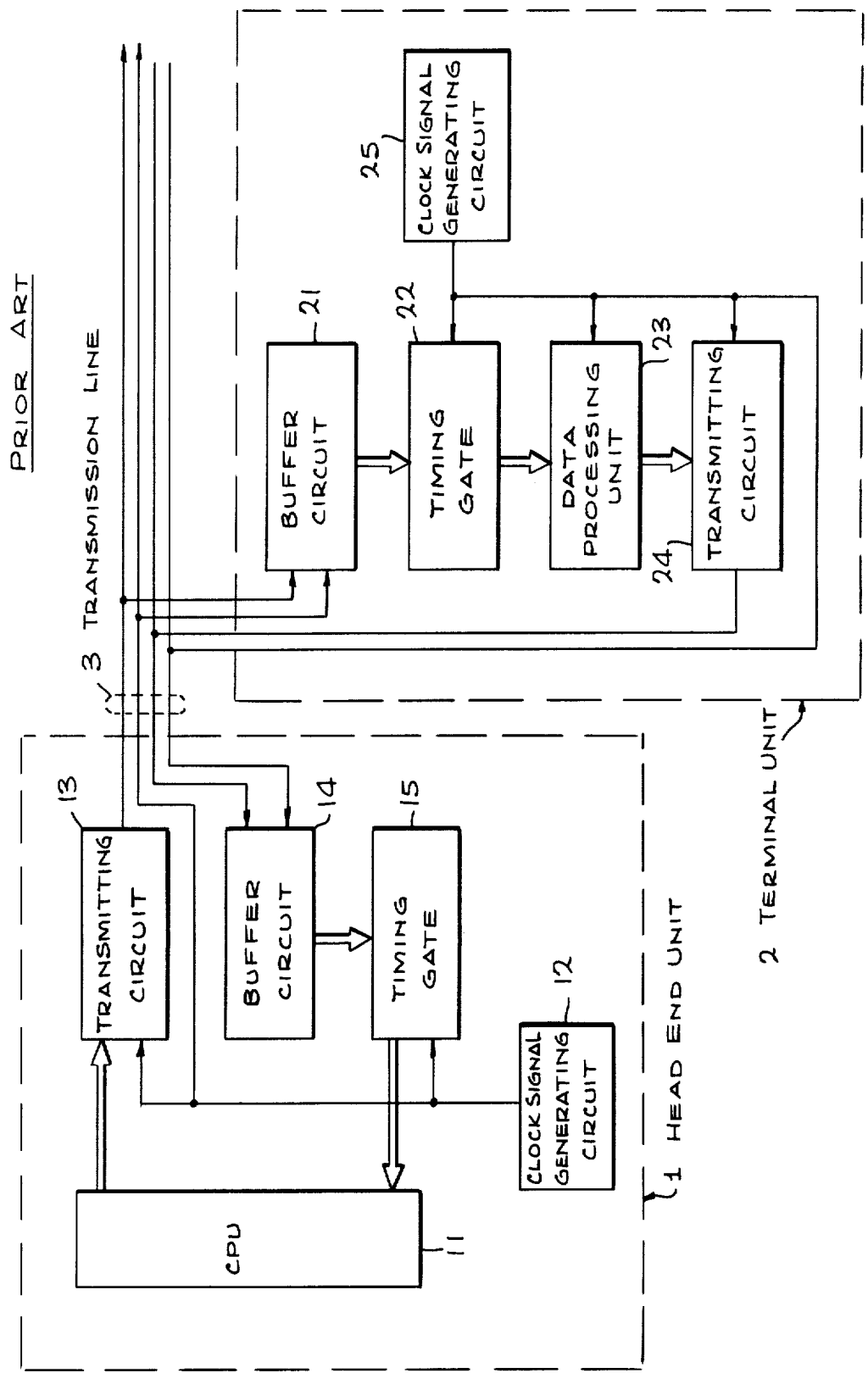
FIG. 1 is a block diagram of one example of a prior art bidirectional data communication system.

A communication system as shown in FIG. 1 is one example of a conventional bidirectional data communication system. In FIG. 1, reference numeral 1 represents a central or head end unit, which has a central processing unit (CPU) 11 for processing data signals, a clock signal generating circuit 12, a transmitting circuit 13, a buffer circuit 14 and a timing gate 15. Terminal units 2 are disposed at a number of remote locations, each including a buffer circuit 21, a timing gate 22, a data processing unit 23, a transmitting circuit 24 and a clock signal generating circuit 25. The head end unit 1 and the respective terminal units 2 (only one of which is shown) are connected by transmission line 3 of four channels. In the head end unit 1, data processed at the central processing unit 11 and to be transmitted to the respective terminal units 2 are fed to the transmitting circuit 13 and are transmitted as downstream data signals via the downstream channel of a transmission line 3 together with clock signals from the clock signal generating circuit 12. At this time the clock signal itself is also fed to the terminal units 2 through another downstream channel. On the other hand, in the terminal units 2, the buffer circuit 21 receives the downstream data signal and clock signal and reads the downstream data signal, using the received clock signal, and then stores these data signals. The downstream data signal thus received is fed from the buffer circuit 21 through the timing gate 22 to the data processing unit 23 in response to the clock signal from an independent clock signal generating circuit 25 in each terminal unit 2. After the data to be transmitted to the head unit unit 1 are processed at the data processing unit 23, the data are fed to the transmitting circuit 24 and are transmitted as the upstream data signal together with the clock signal from the clock signal generating circuit 25 to the upstream channel of the transmission line 3. At this time, the clock signal is also transmitted through the upstream channel to the head end unit 1. In the head end unit 1, the buffer circuit 14 receives the upstream data signal and the clock signal and reads and stores the upstream data signal using the clock signal thus received. Then, the upstream data signal is fed from the buffer circuit 14 through the timing gate 15 to the central processing unit 11 by the timing in response to the clock signal from the clock signal generating circuit in the head end unit 1.

Since the lengths of the transmission lines between the head end unit 1 and the respective terminal units 2 are not equal, if one clock signal is fed bidirectionally back and forth therebetween, their phases are shifted or displaced in every terminal unit so that the upstream data cannot be read in the head end unit 1 with the result that the head end unit 1 should have a clock signal generating circuit 12 and special clock signal generating circuit 25 is also necessary even in the respective terminal units 2. Furthermore, since the clock frequencies are different from each other, it has been necessary to provide the buffer circuits 14 and 21 in the respective inputs so as to convert the clock rate. One head end unit 1 generally has an extremely large number of terminal units and the respective terminal units therefore become complicated so as to disadvantageously increase costs of the entire system.

Figure 2:
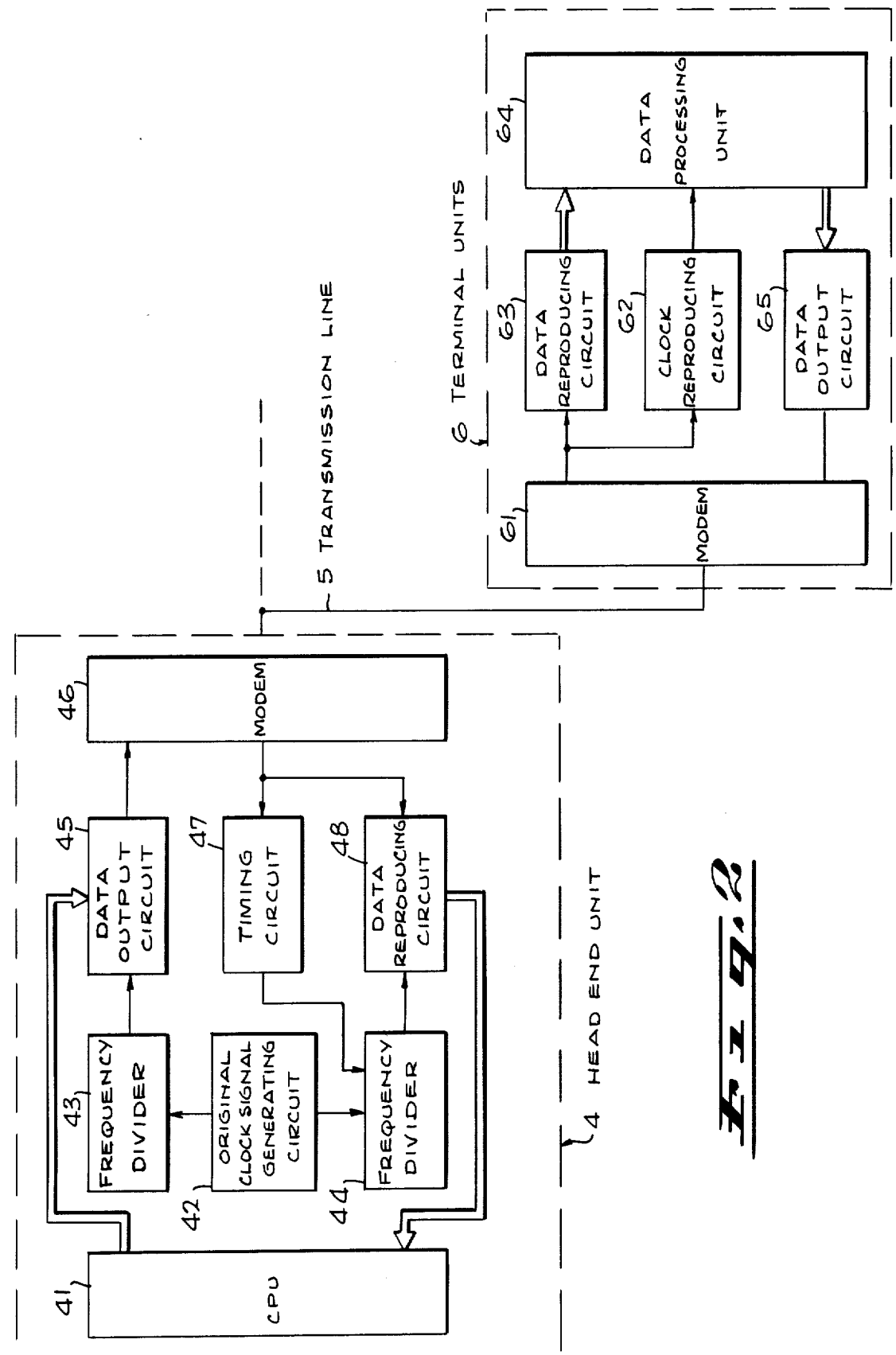
FIG. 2 is a block diagram showing one embodiment of a bidirectional data communication system according to the present invention.

The present invention will now be described in detail in accordance with the embodiment shown in the drawings. In FIG. 2, reference numeral 4 indicates a central or head end unit, which has a central processing unit (CPU) 41, an original clock signal generating circuit 42, frequency dividers 43 and 44 for dividing the clock signal to 1/n, a data output circuit 45, a modem (modulating and demodulating circuit) 46, a timing circuit 47 for compensating the phase of upstream clock signal, and a data reproducing circuit 48 for reproducing upstream data. The original clock frequency, n, is preferably a substantial multiple (e.g. n=32) of the data rate, for reasons described hereafter. Numeral 6 illustrates one of a number of terminal units, each of which has a modem (modulating and demodulating circuit) 61, a clock reproducing circuit 62 for reproducing the downstream clock signal, a data reproducing circuit 63 for reproducing downstream data, a data processing unit 64 and a data output circuit 65 for feeding out upstream data. The head end unit 4 and each of the terminal units 6 are connected by a transmission line 5.

The data to be transmitted to the terminal units 6 from the head end unit 4 are processed at the central processing unit 41 and are then fed to the data output circuit 45. The original clock signal generating circuit 42 always generates a clock signal of high frequency, which signal is divided into 1/n of the frequency of the clock signal by the frequency dividers 43 and 44. In the present invention, actual data communication is conducted using the clock signal divided into 1/n. The downstream data from the central processing unit 41 are converted to bi-phase space (BPS) signals together with the clock signal from the frequency divider 43 by the data output circuit 45 and are then fed to the modem 46 and are frequency shift keyed (FSK) modulated onto a carrier and fed to the transmission line 5 as downstream signals together with carrier.

Figure 3:
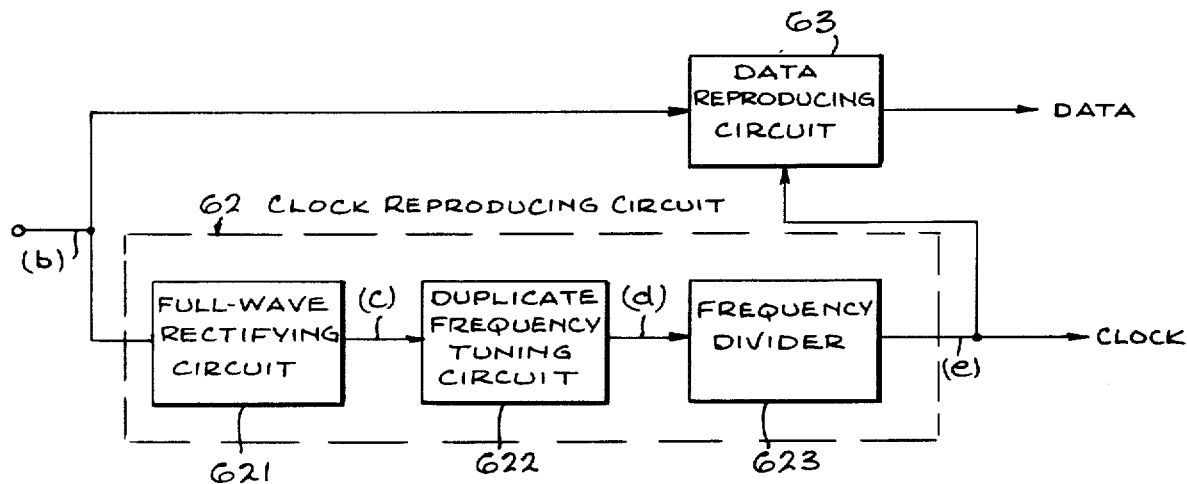
FIG. 3 is a block diagram showing the detailed embodiment of the clock reproducing circuit 62 shown in FIG. 2.
Figure 4:
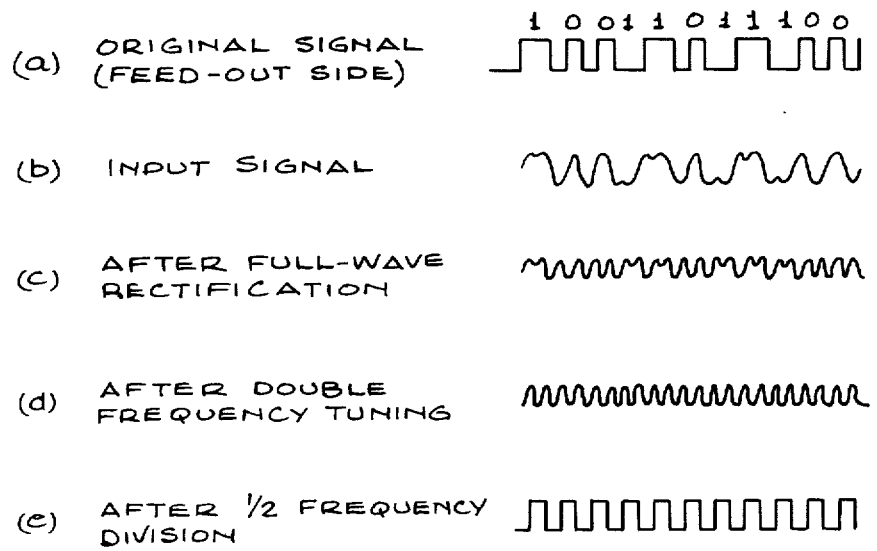
FIG. 4 comprises waveform diagrams for explaining the operation of different parts of the circuit shown in FIG. 3.

In the terminal units 6, the downstream data signal and clock signal FSK modulated from the transmission line 5 are demodulated by the modem 61 and are fed to the clock reproducing circuit 62 and data reproducing circuit 63. The operation for reproducing the clock and data signals from the downstream signal demodulated by the modem 61 will now be described with reference to FIGS. 3 and 4. The orignal data signal formed by the data output circuit 45 in the head end unit 4 is a sharp rectangular wave as shown at (a) in FIG. 4, but is deformed by the time it is fed to the terminal units 6 through the transmission line 5 as shown at (b) in FIG. 4. In FIG. 3, the demodulated signal from the modem 61 is rectified in full-wave manner by a full-way rectifying circuit 621 in the clock reproducing circuit 62 so as to become the waveform (c) as shown in FIG. 4. Then, the waveform of the signal thus rectified is shaped to a sine wave having twice the frequency of the downstream clock signal as shown at (d) in FIG. 4 by a double frequency tuning circuit 622. Thereafter, this signal is converted to a rectangular wave of ½ the frequency by a ½ frequency divider 623. As shown at (e) in FIG. 4, this signal is a clock signal of the same frequency as that of the clock signal generated by the frequency divider 43 of the head end unit 4 and is fed to the data processing unit 64 and also to the data reproducing circuit 63 used for reproducing the data signal from the signal of the modem 61 shown at (b) in FIG. 4. This data signal is processed by the data processing unit 64 and the terminal units 6 or its accessories are controlled thereby.

The data to be fed to the head end unit 4 from the terminal units 6 are formed at the data processing unit 64 and are fed to the data output circuit 65. Using the clock signal reproduced by the clock reproducing circuit 62, the data are converted here to a BPS signal, then applied to the modem 61. This signal is then phase shift keyed (PSK) modulated onto a suitable carrier and is fed to the transmission line 5 as the upstream signal together with carrier.

Figure 5:
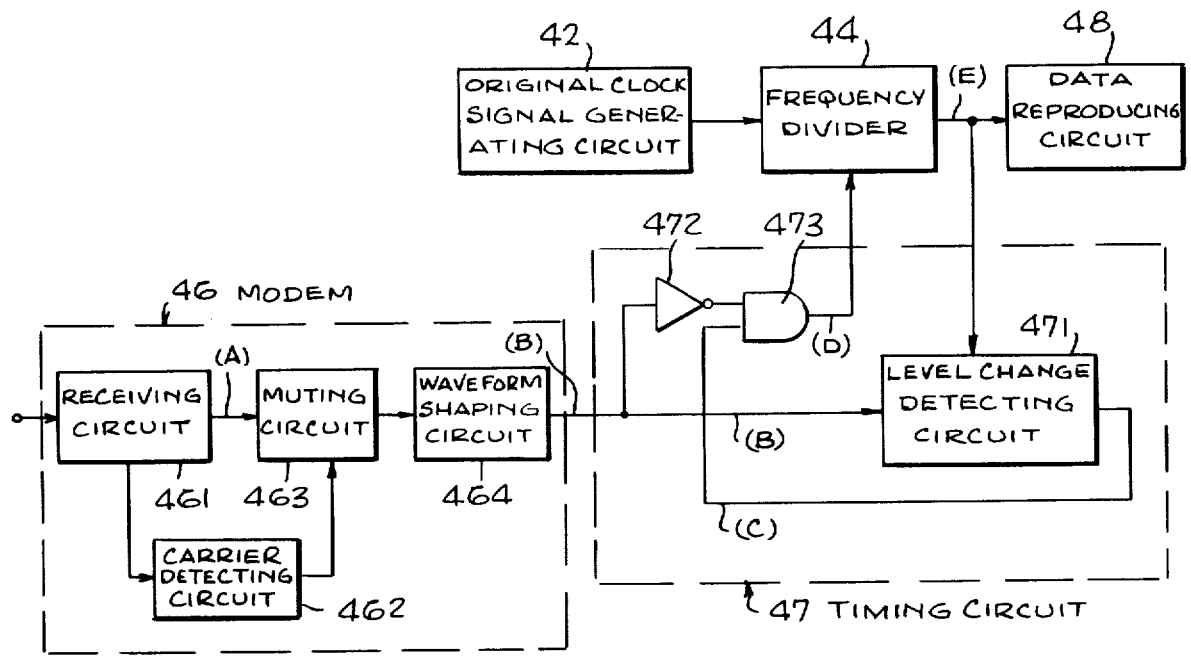
FIG. 5 is a block diagram showing the detailed embodiments of a modem and timing circuit included in the head end unit shown in FIG. 2.
Figure 6:
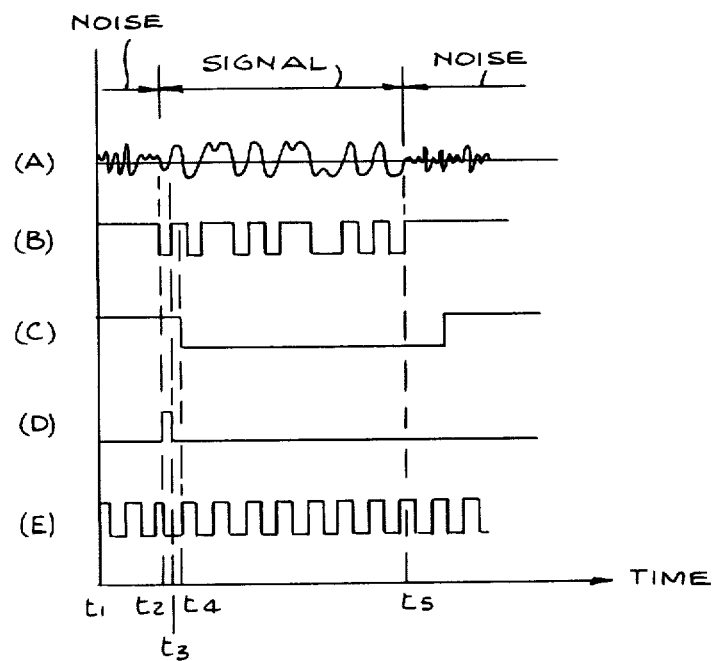
FIG. 6 comprises waveform diagrams for explaining the operation of the circuit shown in FIG. 5.

In the head end unit 4, this upstream signal is demodulated by the modem 46. As shown in FIG. 5, the modem 46 has a receiving circuit 461 for receiving the data channel (carried with PSK signal), a carrier detecting circuit 462 for detecting the carrier, a muting carrier 463, and a waveform shaping circuit 464. The upstream signal is PSK demodulated by the receiving circuit 461. The carrier is detected by the carrier detecting circuit 462. When the carrier is not detected, it is recognized that there exists no upstream data so that the muting circuit 463 is operated with the result that the noise as shown by the times t1 to t2 at waveform (A) in FIG. 6 is removed. If the carrier is detected, the output of the receiving circuit 461 is passed through the muting circuit 463 as shown by the times t2 to t5 in waveform (A) of FIG. 6 and is shaped to a rectangular wave (BPS signal) by the waveform shaping circuit 464 as shown by waveform (B) in FIG. 6. The output of the waveform shaping circuit 464 is applied to a level change detecting circuit 471 in the timing circuit 47 and is simultaneously applied through a NOT or inverter circuit 472 to AND circuit 473. The level change detecting circuit 471 produces a high level voltage during the times t1 to t2 in waveform (C) of FIG. 6 in the stand-by state where the data signal is not received, while the waveform shaping circuit 464 during this time period also produces a high level voltage which is changed to low level voltage by inverter circuit 472. AND circuit 473 does not therefore produce any outut during the time period t1 to t2 in waveform (D) of FIG. 6.

However, the output of the waveform shaping circuit 464 becomes low level as shown in waveform (B) immediately when the carrier appears at the time t2. This low level is converted by the circuit 472 to a high level, and the output of the level change detecting circuit remains at a high level. AND circuit 473 therefore produces an output as shown in waveform (D) at the time t2. The frequency dividing operation of the frequency divider 44 is thereby stopped by resetting the divider 44 to the beginning of a low level interval. Thus, the frequency divider 44 has continued to divide the signal from the original clock signal generating circuit 42 to 1/n division until the time t2 as shown at (E) in FIG. 6, and then the frequency divider 44 output goes to low level coincident with the leading edge of the waveform (D). The level change detecting circuit 471 checks the level change of the waveform (B) from the waveform shaping circuit 464 in every half cycle of the waveform (E) using the output signal from the frequency divider 44. That is, the output of the level detecting circuit 471 (waveform (C)) remains at high level when the level of the frequency divided waveform (E) varies either from low to high level or from high to low level if the level of the waveform (B) of FIG. 6 is not varied. The output of the level detecting circuit 471 changes to low level after the level of the waveform (B) has changed twice when the next positive-going transition in the waveform (E) occurs. As the waveform (E) is a BPS signal, the level is always varied (inverted) in every half cycle, or twice in one cycle of the clock (although the waveform (E) and the received data are initially out of phase, they are the same in frequency). Therefore, if the monitored change of state of the waveform (E) for every half cycle is stored for the next half cycle and two changes of state occur, the output of the level change detecting circuit 471 (waveform (C) in FIG. 6) will shift to low level after the first data signal in a data burst arrives. Since the level change detecting circuit 471 in effect has a storage operation, the waveform (C) in FIG. 6 does not initially become low level (time t2) when the signal arrives but maintains high level. Then, if waveform (B) again becomes high level at the time t3, the output of the AND circuit 473 becomes low level and the frequency divider 44 starts again to divide. Thus, the frequency divider 44 again starts to produce an output (the waveform (E) in FIG. 6) from the time t4 utilizing ¼ cycle from the time t3 to change state. The transition at t3 represents a zero crossing which can be used to clock the data, and a ¼ cycle delay can be employed to generate strobe pulses in the system. Other circuit techniques can be used to provide the response to the first pulse in a data burst, and to control the frequency divider so as to provide a digital adjustment of phase. If a clock signal of twice the frequency of the output from the frequency divider 44 (the signal having 1/n frequency of the original clock signal) is provided, this delay time is equal to a half cycle (half clock) of the clock signal established by the frequency divider 44. Alternatively, the clock from the frequency divider 44 may be reproduced very easily within the level change detecting circuit 471. However, a higher multiple in the original clock frequency enables the phase of the clock to be more precisely adjusted to the phase of the data stream.

When the frequency divider 44 starts to produce a positive-going output (the waveform (E) in FIG. 6) in delaying ¼ clock from the time t3, the output of the level change detecting circuit 471 (the waveform (C) in FIG. 6) simultaneously becomes low level and maintains the low level as long as the aforementioned data signal (the waveform (B) in FIG. 6) continues. Consequently the waveform (D) provides a pulse only in response to the start of a data sequence, and the reclocking operation does not take place with subsequent pulses in the data sequence.

Thus, the clock obtained by dividing the frequency of the output of the original clock signal generating circuit 42 to 1/n is once stopped by the clearing operation of the frequency divider 44, and is so compensated in phase as to have a phase difference of ¼ clock from the internal clock signal of the upstream signal. The readjusted clock is then applied to the data reproducing circuit 48 and is accordingly used to read BPS signal from the modem 46. The upstream data read and reproduced by the data reproducing circuit 48 is fed to the central processing unit 41 and is then processed.

As the foregoing description, the present invention can obtain remarkably satisfactory advantages and effects for the bidirectional data communication system. Because the bidirectional data communication system of the present invention does not require a clock signal generating circuit in the respective terminal units, a number of terminal units can be manufactured less expensively so as to greatly decrease the cost of the entire communication system. As the bidirectional data communication system of the invention then utilizes the clock signal from the head end unit in the terminal units as it is, the timing of the reception and transmission of the data can be easily provided in the terminal units with the result that a buffer circuit for matching the timing of the clock signal in the downstream signal to the clock signal generated independently in the terminal units becomes unnecessary. It should also be understood that the transmission lines between the head end unit and the respective terminal units are different from conventional communication systems in that the phases of the clock signals from the respective terminal units do not become coincident to each other. This feature results from the fact that the phase of the clock signal for reproducing the upstream data is compensated in the head end unit by utilizing the internal clock signal in the upstream signal from the respective terminals. In the bidirectional data communication system of the present invention, the frequencies of both the clock signals of the head end unit and the respective terminal units are in phase and the upstream data can thus be accurately read. In addition, it is also recognized in the bidirectional data communication system of the invention that if the phase of the clock signal for reproducing the data is once compensated at the initial part of the upstream data or at the clock signal inserted before the upstream data, as the frequencies of both the clock signals of the head end unit and the respective terminal units are the same in phase, even extremely long data messages can be precisely read.

What is claimed is:

1. A bidirectional data communication system which comprises:
   a head end unit including a central processing unit (CPU) for processing data to provide data signals, a clock signal generating circuit for generating original clock signals, a transmitting circuit for feeding out the data signals from the central processing unit as downstream data signals to a downstream channel using the original clock signals from the clock signal generating circuit, a phase compensating circuit coupled to receive the original clock signals and upstream data signals from a terminal unit, the original clock signals having a frequency that is a multiple of the frequency of the downstream data rate, and the phase compensating circuit including controllable frequency divider means coupled to receive the original clock signals, and means responsive to the upstream data signals for resetting the frequency divider means in accordance with the phase of the upstream data for compensating the original clock signals so as to provide phase compensated clock signals corresponding in phase to upstream clock signals contained in upstream data signals from a terminal unit, and a data reproducing circuit for reproducing upstream data signals from a terminal, said data reproducing circuit being responsive to the phase compensated clock signals from the phase compensating circuit for providing data outputs to the central processing unit that may be processed in the central processing unit despite timing variations in the upstream clock signals; and a number of terminal units each including a clock signal reproducing circuit for reproducing only the received original clock signals contained in the downstream signal from the head end unit, a data reproducing circuit for reproducing downstream data signals using the reproduced clock signal output of the clock signal reproducing circuit, a data processing unit for processing the output of the data reproducing circuit and providing upstream data signals to be fed out to the head end unit, and a transmitting circuit coupled to the data processing unit and clock signal reproducing circuit for transmitting the upstream data signals from the data processing unit to the head end unit containing the reproduced upstream clock signals from the clock signal reproducing circuit.

2. A bidirectional data communication system according to claim 1, further comprising means at the head end unit and terminal unit for converting the clock signal and data signal to bi-phase space (BPS) signals to transmit and receive the data in both upstream and downstream directions.

3. A bidirectional data communication system according to claim 2, wherein the downstream signal is a frequency shift keyed (FSK) signal and the upstream signal is a phase shift keyed (PSK) signal.

4. A bidirectional data communications system with a central unit and a number of terminals, and with downstream and upstream data transmitted between the central unit and the terminals including:

means at the central unit for transmitting downstream data containing self-clocking transitions;

means at each terminal for transmitting upstream data in response to and in synchronism with the self-clocking transition in the downstream data;

clock means at the central unit for generating original clock pulses having a frequency that is a multiple of the data rate at the central unit;

controllable frequency divider means responsive to the original clock pulses for reducing the frequency to that of the central unit data rate;

means responsive to the upstream data for resetting said controllable frequency divider means in accordance with the phase of the upstream data; and data reproducing means responsive to the reduced frequency output of the controllable frequency divider means and to the upstream data for providing signals that are compensated in timing for the timing variations in the upstream signals.

5. The invention as set forth in claim 4 above, wherein said means for resetting said frequency divider means is responsive only to initial data transitions in the upstream data.

6. The invention as set forth in claim 5 above, wherein said means for transmitting upstream data comprises means responsive to downstream data for generating signals at double the frequency of the downstream data signals, and second frequency divider means coupled to divide the double frequency signals.

7. The invention as set forth in claim 5 above, wherein said clock means generates a frequency that is a substantial multiple of the data rate, wherein said means for resetting said controllable frequency divider means includes means responsive to the upstream data signal and the controllable frequency divider means for detecting level changes in the upstream data signal and gating means responsive to the detected level changes for resetting the controllable frequency divider means.

8. The invention as set forth in claim 7 above, wherein said system further includes means responsive to the upstream data at the central unit for detecting the transmission of the data carrier of the upstream data signal, means responsive to the detected presence of the data carrier for muting the incoming signals, and means responsive to the incoming signals for generating rectangular shaped waveforms in response thereto.

* * * * *

UNITED STATES PATENT AND TRADEMARK OFFICE
CERTIFICATE OF CORRECTION

PATENT NO. : 4,225,939
DATED : September 30, 1980
INVENTOR(S) : Kenji Yashiro

It is certified that error appears in the above-identified patent and that said Letters Patent are hereby corrected as shown below:

Column 3, line 58, after "The" and before "data", "orignal" should read --original--; line 64, after "a" and before "rectify-", "full-way" should read --full-wave--. Column 4, line 26, after "channel (" and before "with", "carried" should read --carrier--; line 51, after "any" and before "during", "outut" should read --output--.

Signed and Sealed this

*Thirteenth* Day of *January 1981*

[SEAL]

*Attest:*

*Attesting Officer*

SIDNEY A. DIAMOND

*Commissioner of Patents and Trademarks*